June 23, 1925.  
C. F. SEYBOLDT  
ANTIRATTLING DEVICE  
Filed May 7, 1924
1,542,844
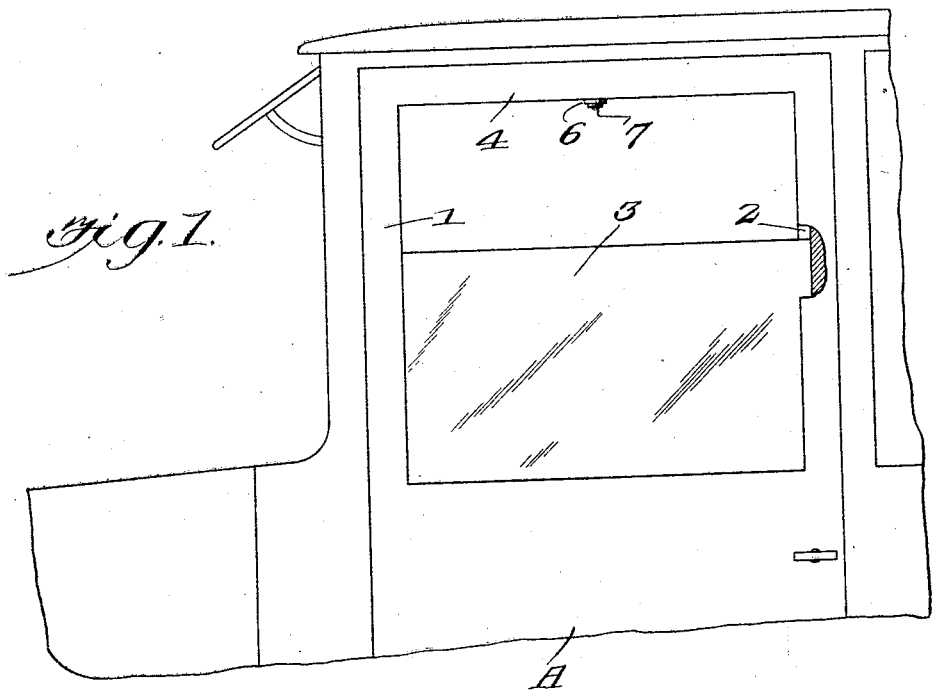
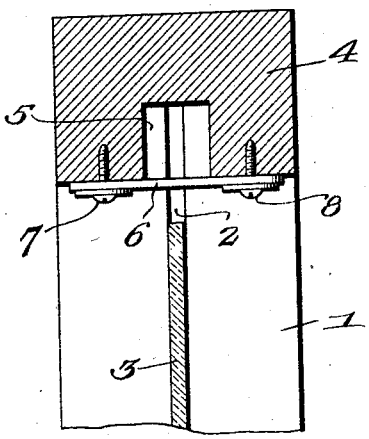
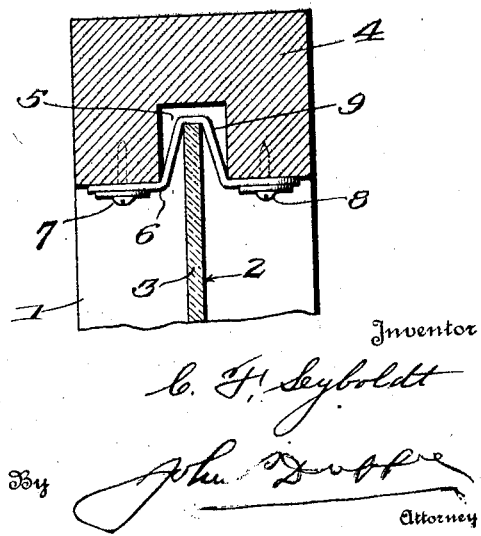
Inventor  
C. F. Seyboldt  
By John Duffie  
Attorney Patented June 23, 1925.

1,542,844

UNITED STATES PATENT OFFICE.

CARL F. SEYBOLDT, OF DEFIANCE, OHIO.

ANTIRATTLING DEVICE.

Application filed May 7, 1924. Serial No. 711,649.

*To all whom it may concern:*

Be it known that CARL F. SEYBOLDT, a citizen of the United States, residing at Defiance, in the county of Defiance and State of Ohio, has invented certain new and useful Improvements in Antirattling Devices, of which the following is a specification.

This invention relates to new and useful improvements in anti-rattling devices and more particularly to devices for preventing the rattling of the glass window panels of automobiles.

The principal object of my invention is to provide a novel and improved device of this character which will prevent rattling of the glass window panes when the same are raised into closed position.

A further object of my invention is to provide a device of this character, simple and economical in construction and highly efficient in operation. With the foregoing and other objects in view that will appear as the nature of my invention is better understood, the same consists in the novel features of construction, combination and arrangement of parts illustrated in the drawings and more particularly pointed out in the appended claims.

In the accompanying drawings which are for illustrative purposes only, and are therefore not drawn to scale:—

Figure 1 is a side elevation, illustrating the application of my invention.

Figure 2 is a vertical transverse section, the glass panel lowered, and

Figure 3 is a similar view, the glass panel in raised or closed position.

Referring to the drawings for a more particular description of my invention and in which drawings like parts are designated by like reference characters throughout the several views, A represents a portion of the side of an automobile body and top which has the vertical stiles 1 formed with grooves 2 for the reception of the vertical edge portions of the sliding glass panels 3. In the upper cross member 4 of each window frame is formed a longitudinal horizontal groove 5 which receives the upper end of the glass panel when in closed position.

On the ordinary construction, the glass panel rattles as the automobile passes over rough streets or roads which is not only annoying to the occupants of the car but endangers the panel, which is often broken. It is the principal object of my improved device to prevent this rattling of the panel when it is in closed position. The device comprises an elongated strip 6 of rubber or other suitable elastic material which extends across the bottom of the groove 5 in the upper cross member 4 of the window frame and is secured at opposite ends to the bottom wall of said upper member at opposite sides of said groove by the fastening screws and washers 7 and 8, respectively.

In practice, when the glass panel is raised into closed position, the upper end of the panel engages the elastic strip and causes it to stretch and buckle at the center or middle. The central buckled portion 9 of this elastic strip is forced upwardly into the groove 5 of the upper cross member 4 as shown in Figure 3 and provides a cushion which eliminates any vibration or rattling to which the glass panel would otherwise be subjected in passing over rough or uneven surfaces.

From the foregoing description taken in connection with the drawings it is thought that the construction, operation and advantages of my invention will be readily understood without requiring a more extended explanation.

Having described my invention what I claim as new and desire to secure by Letters Patent is:—

1. In combination with the upper grooved member of the window frame of an automobile, an elastic strip extending transversely across the bottom of the groove in said member and means for fastening the ends of said elastic strip to the bottom wall of said upper member.

2. In combination with the upper grooved cross member of the window frame of an automobile, an elongated elastic strip extending transversely across the bottom of the groove in said member and fastening screws for securing the ends of said strip to the bottom wall of said cross member at opposite sides of said groove, said elastic strip adapted to buckle at the middle and extend into the groove when the glass panel is raised into closed position.

In testimony whereof he affixes his signature.

CARL F. SEYBOLDT.